G. A. SETZER.
AUTOMATIC PIPE CLEANING APPARATUS.
APPLICATION FILED AUG. 30, 1906.

900,599.

Patented Oct. 6, 1908.

2 SHEETS—SHEET 1.

WITNESSES:

INVENTOR
Gustav A. Setzer
BY
Frank W. Ashley
ATTORNEY

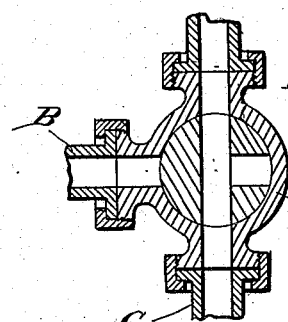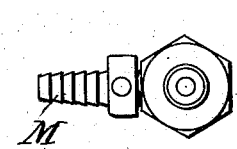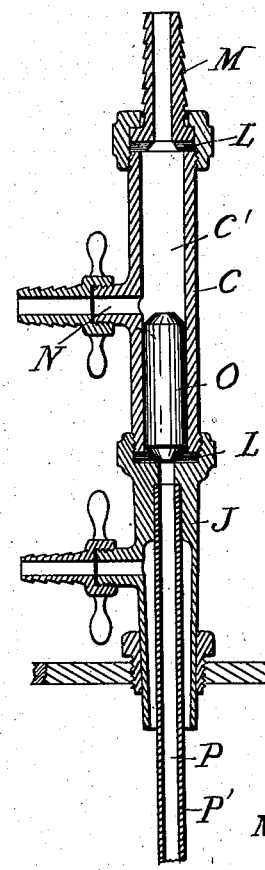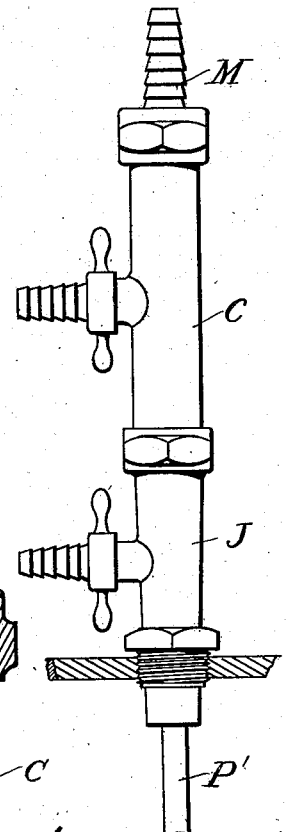

UNITED STATES PATENT OFFICE.

GUSTAV A. SETZER, OF NEW YORK, N. Y., ASSIGNOR TO CHARLES S. AVERILL, OF SYRACUSE, NEW YORK.

AUTOMATIC PIPE-CLEANING APPARATUS.

No. 900,599.   Specification of Letters Patent.   Patented Oct. 6, 1908.

Application filed August 30, 1906. Serial No. 332,722.

*To all whom it may concern:*

Be it known that I, GUSTAV A. SETZER, a citizen of the United States, and resident of New York city, in the county of New York and State of New York, have invented certain new and useful Improvements in Automatic Pipe-Cleaning Apparatus, of which the following is a specification.

My invention relates to apparatus for dispensing liquids such as beer, and the object of the invention is to provide an apparatus whereby the beer in the beer pipes may be returned to the kegs located at a comparatively remote point from the dispensing faucets, the beer pipes cleaned, and the supply of beer to the beer pipes, reëstablished, all of which operations being effected from a point behind the bar, thus obviating the necessity of the attendant leaving his position behind said bar.

A further object is to attain the results above referred to, without wasting any beer or allowing the beer to become mixed with water during the pipe-flushing operation except in a fractional degree. The several results are effected by simple and cheap means.

Figure 1:
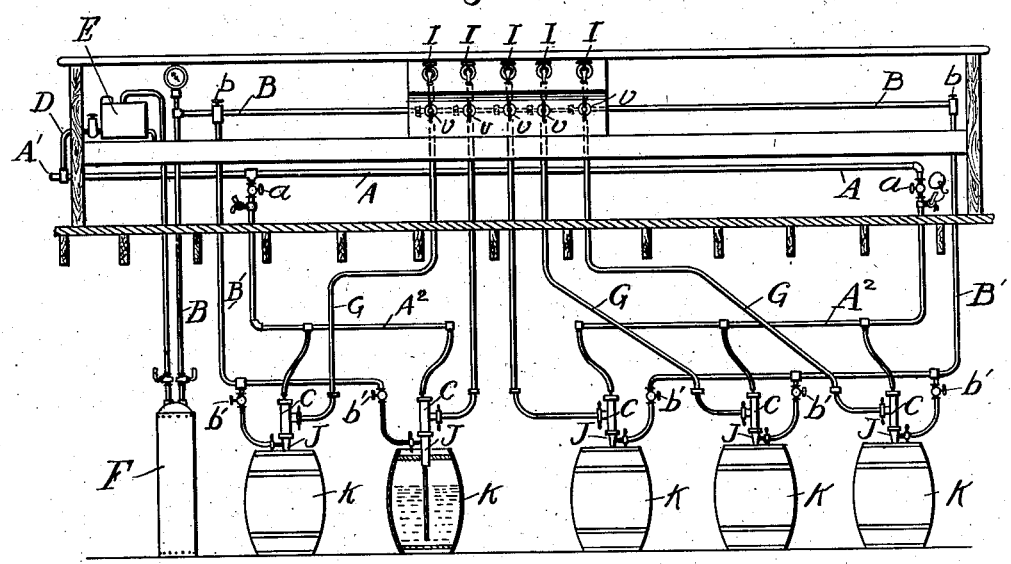
Figure 2:
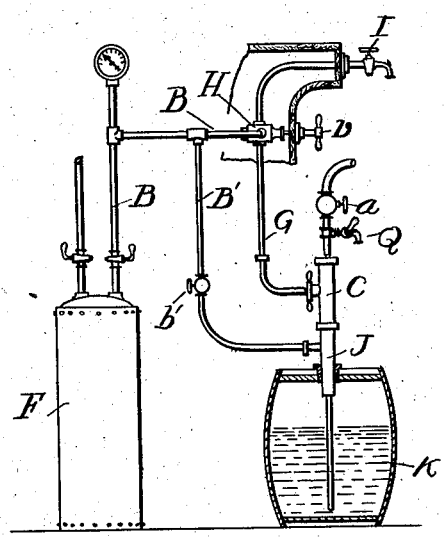

In the accompanying drawings forming part of this specification,—Figure 1, is an elevational view of partly sectional character and illustrating an apparatus embodying my invention, the view representing the rear of a bar and a part of a cellar beneath the floor on which the bar is located. Fig. 2, is another elevational view, partly in section, disclosing an unconventional form of the apparatus, the water valve, vent faucet, upper part of the bar and features in immediate relation to said bar, for the purposes of illustration purely, being shown in unwarranted proximity to the novel valve device and the receptacle on which it is mounted. Fig. 3, is a plan view of the automatic valve casing. Fig. 4, is a side view of the valve casing and the tap on which it is mounted. Fig. 5, is a vertical sectional view of the parts disclosed in Fig. 4, the valve body occupying a position cutting off the supply of beer to the beer pipe, and the latter being open to the water-flushing supply. Fig. 6, is a sectional view of a three-way cock designed for alternately establishing communication between the beer pipe and a dispensing faucet, or between said pipe and a compressed air supply, the latter adjustment directing the compressed air into the beer-pipe to force the beer back to the keg by equalizing the pressure. Fig. 7, is a vertical sectional view disclosing an automatic valve device adapted to be used where the water pressure is lower than the air pressure.

A indicates a water pipe connected with the water main of a city or other source of water under equal pressure, and $a$, $a$, are valves which govern the flow of water from the pipe A, by means of branch pipes $A^2$, to the top connections of the several valve casings C, and A' is the inlet pipe to the pipe A and a pipe D, which latter leads the water to an air-compressor E, by means of which a tank F, is supplied with compressed air.

B indicates the air-pressure piping and $b$, $b$, are valves by means of which the air is supplied to or cut off from the branch pipes B', respectively.

Valves $b'$, $b'$, which are interposed in the branch pipes B', are normally left open, and the air is controlled by the air valves $b$, $b$, located on the upper floor, usually under the bar, as are also the three-way cocks H and a part of the beer-pipes G, one of said cocks being shown in section in Fig. 6, and their positions with respect to the bar being indicated in Fig. 2.

I, I, I, etc., designate the beer faucets at the bar.

J, J, etc., refer to the beer-taps and K, the kegs.

Each of the valve-casings C is provided with a cylindrical bore forming a chamber C', Fig. 5, within which is a reciprocative trunk piston O, having a valve at each end adapted to intimately conform with one of the valve-seats L, or L', located at each end of the chamber. These seats are preferably presented by disks of good soft rubber which adapts said disks to serve as washers or gaskets for the hose connection M, at one end of the casing, and between the other end of the casing and the tap J.

A laterally projecting threaded nipple intermediately on the casing provides an outlet N, from said valve chamber, the piston O, being of such length as to pass the outlet opening, in its movements from one valve-seat to another. When the piston moves so that its upper valve closes the opening in the seat L, the opening in the lower seat L', will be open and communication established between the keg interior, duct P, in the tap-pipe P', casing chamber C', the outlet N, and a beer-pipe G, which latter is connected to the nipple forming said outlet. Obviously the beer pipe leads to one of the dispensing faucets I. When said piston is in its lowest position, the beer is cut off from the chamber C', and beer-pipe, and water admitted from the pipe $A^2$, to the beer-pipe by way of the chamber C'.

In Fig. 2, important parts of the invention which have been described, are represented in an arrangement of intimate association, which would never be followed in practice, and which is merely shown in the peculiar manner disclosed, to the end that the functional interrelation of said parts may be the more easily grasped. Thus a portion of the bar with certain immediately situated parts of the apparatus, are shown as unduly near the air reservoir, and one of the kegs and its valve device, the flooring being eliminated, and the water controlling valve $a$, and vent pipe Q being directly on the valve device, an arrangement which as before intimated, would not be followed in practice, and further, would not be in accordance with the invention.

Each three-way valve H, is controlled by a stem and handle $v$, said valve being connected to its particular beer-pipe G, and the air-pipe B. Fig. 6, represents the valve as establishing communication with the faucet pipe so that the flow of beer will be straight through said valve to said faucet. The airway is shown in the cut-off position.

Assuming the pressure of the water in the main to be greater than the air-pressure on the beer, and the valve H, to be in a position to permit the flow of beer to the faucet, and it is desired to clean the beer pipe with water, the following operation is pursued. The valve H is turned to cut off the flow of beer to the faucet I, and at the same time, the airway in the valve H, is brought into communication with the air-pipe B, thus equalizing the pressure in the keg K, and on top of the column of beer in the pipe G, under which conditions, the beer will flow slowly back into the keg by way of pipe G, chamber C', and conduit P. After briefly waiting to permit all the beer to flow back into the keg, the water-valve is opened and the piston O now being subject to a greater pressure than that exerted by the air, will be forced down to cut off communication between the chamber C' and the keg, and permitting the water to flow to the outlet N. The valve H, is now manipulated to connect the beer-pipe with the faucet, thus closing the air passage. The faucet I, is opened, which first permits the confined air in the pipe G, to escape, and thereafter the water to flow to and through said faucet to the drain, thus effecting the cleansing of the beer-pipe.

When it is desired to turn on the beer again, the water-valve $a$ is closed, and the vent valve Q, is opened to release the pressure in the pipe $A^2$, whereupon the air pressure in the keg will force the beer upward, raise the piston to and maintain it in its highest position, and thus open the passage to the pipe G, through which the beer will flow and force the column of water therein out through the faucet I. As soon as the beer appears at the faucet, the latter is closed and the beer is ready to be drawn for use.

It will be understood that the pipes may be cleansed without using the air, such result being attained by simply allowing the water to force out through the faucet, the beer in the pipe G after the valve O closes off the beer at the keg, the beer forced out being kept in a separate receptacle, and after the pipe is cleaned, to shut off the water as before described, vent the water pipe, and subsequently allow the water to be forced out by the beer, after the seat L is closed.

In Fig. 7, is shown an automatic valve device which may be used in places where the water pressure is lower than the air pressure, the differences between this construction and the valve device heretofore disclosed, being that the upper valve O' of the piston $O^2$, is of larger diameter than the lower valve, and the casing contains a small groove X, which permits the fluid which would otherwise be trapped below the larger valve and the casing, to escape. This valve allows the piston $O^2$, to be operated by a low water pressure and a high air pressure, the relative areas of the valve ends being determined by the degree of difference in the water and air pressures.

The arrangement illustrated in Fig. 1, is such, that when the pipes on one line of kegs are being cleaned, the beer for service will be drawn from another line of kegs. If no beer is to be drawn while the pipes are cleaned, one set of kegs and piping will be sufficient.

Importance is attached to the fact that the cleansing operation takes place at a point in immediate contiguity to each keg, and is continuously and thoroughly conducted from thence on to and through the dispensing faucet pertaining to each keg. A conspicuous feature of novelty connected with the invention, involves the arrangement whereby the alternate movements of the valve-piston are effected by the fluids acting directly on said valve and controlled from a comparatively remote point and at the rear of the bar. At night, upon closing the establishment wherein the apparatus is installed, (or at dull periods during the day,) the beer or ale in the coils of pipe and said outlet pipe, can be returned to the keg or barrel, while it is still fresh, without releasing the air, and thereby avoiding the serving of stale or contaminated beer or ale to the customers, when business is resumed. This practice, obviously, eliminates the waste of beer or ale, which would otherwise stand in the pipes all night and have to be run off in the morning.

The pipes and coils can be flushed each night with water until the latter runs clear, after which the water can be permitted to remain in the pipes overnight, thereby dispensing with the use of chemicals, escape the necessity of disconnecting the pipes to clean them, and thus insuring at all times, a clean and sanitary service. As each outlet pipe is independent, when a keg or barrel is empty, the dregs may be washed out from the faucet to the barrel by admitting the water, after turning off the air and releasing the bung at the package. Manifestly, this procedure saves any waste from the new package.

Having now described my invention, what I claim as new and desire to secure by Letters Patent, is—

1. In apparatus for dispensing liquids under pressure such as beer, the combination of a device having an outlet and inlets, the latter for the admission of the liquid under pressure and a second liquid, respectively, said device including valve-means adapted to alternately cut off each inlet from the outlet before opening communication between said outlet and the other inlet, and a pipe together with manually operable means at a comparatively remote point for admitting the second liquid to the device, the alternate movements of the valve-means being effected by the liquids acting directly thereon.

2. In apparatus for dispensing liquids under pressure such as beer, the combination of a device having an outlet and inlets, the latter for the admission of the liquid under pressure and a second liquid, respectively, said device including valve-means adapted to alternately cut off each inlet from the outlet before opening communication between said outlet and the other inlet, a pipe together with manually operable means at a comparatively remote point, for admitting the second liquid to the device, the alternate movements of the valve-means being effected by the liquids acting directly thereon, and a vent for said pipe contiguously located with respect to said manually operable means.

3. In apparatus for dispensing liquids under pressure such as beer, the combination of a device adapted for connection with a receptacle for containing such liquid, and having an outlet and inlets, one of the latter for communication with the receptacle and the other for the admission of the second liquid, said device including valve-means adapted to alternately cut off each inlet from the outlet before opening communication between said outlet and the other inlet, a remotely located dispensing faucet communicating with said outlet by way of a pipe, means for equalizing the pressure within the outlet pipe and the receptacle, a second pipe and manually operable means for admitting the second liquid to the device, said manually operable means being conveniently located with respect to said faucet, and the alternate movements of the valve-means being effected by the liquids acting directly thereon.

4. In apparatus for dispensing liquids under pressure such as beer, the combination of a device adapted for connection with a receptacle for containing such liquid, and having an outlet and inlets, one of the latter for communication with the receptacle and the other for the admission of a second liquid, said device including valve-means adapted to alternately cut off each inlet from the outlet before opening communication between said outlet and the other inlet, a remotely located dispensing faucet communicating with said outlet by way of a pipe, a source of compressed air, a pipe supplied from said source and communicating with the receptacle independent of the said outlet, a valve in proximity to the dispensing faucet for establishing communication between the air-pipe and the outlet-pipe for equalizing the pressure within the said latter pipe and the receptacle, an additional pipe and manually operable means for admitting the second liquid to the device, said manually operable means being conveniently located with respect to the faucet, the alternate movements of the valve-means being effected by the liquids acting directly thereon.

5. In apparatus for dispensing liquids under pressure such as beer, the combination with a tap, of a device mounted thereon and having an outlet and inlets, the latter for the admission of the liquid under pressure via the tap and a second liquid, respectively, said device including valve-means adapted to alternately cut off each inlet from the outlet before opening communication between said outlet and the other inlet, and a pipe together with manually operable means at a comparatively remote point for admitting the second liquid to the device, the alternate movements of the valve-means being effected by the liquids acting directly thereon.

6. In apparatus for dispensing liquids under pressure such as beer, the combination with a tap adapted to be inserted in a receptacle for containing such liquid, of a device mounted on said tap and having an outlet and inlets, the latter for the admission of the liquid under pressure and a second liquid, respectively, said device including valve-means adapted to alternately cut off each inlet from the outlet before opening communication between said outlet and the other inlet, a remotely located dispensing faucet communicating by way of a pipe with the outlet, a compressed air pipe communicating with the tap, means in proximity to the faucet for establishing communication between said air pipe and the outlet pipe to equalize the pressure within the latter and the receptacle, and a pipe and manually operable means for admitting the second fluid to the device, said manually operable means being conveniently located with respect to the faucet, the movements of the valve-means being effected by the liquids acting directly thereon.

7. In apparatus for dispensing liquids under pressure such as beer, the combination with a piston having valves of varying diameter with respect to each other, the smaller valve being normally acted upon by the pressure of the liquid, to permit the flow of said liquid to a dispensing faucet by way of a pipe, of means for subjecting the larger valve to a fluid for shutting off the flow of the aforementioned liquid, while simultaneously opening a passage for the fluid acting on the larger valve to the pipe leading to the dispensing faucet.

8. In apparatus of the character described, the combination of a casing in immediate proximity to and in direct communication with a source of supply of a liquid to be dispensed, a device adapted to close said communication, means for conveying said liquid by way of said casing to a dispensing faucet, means for causing the liquid to return to the source of supply, means for subjecting the device to a cleaning fluid to cut off the source of supply and admit the cleaning fluid to said casing and permit said fluid to flow by way of said conveying means to and through the faucet.

9. In apparatus of the character described, the combination of a tap for communication with a source of supply of a liquid to be dispensed, means for conveying said liquid from said tap to a dispensing faucet, a device for closing the communication between the conveying means and the source of supply, means for causing the liquid to return to said source of supply, and hand operable means at a point immediately adjacent to the faucet for subjecting the device to a cleaning fluid to cut off the source of supply and admit the cleaning fluid and permit said fluid to flow by way of said conveying means to and through the dispensing faucet.

10. In apparatus of the character described, the combination of a tap for communication with a source of supply of a liquid to be dispensed, a casing directly connected to said tap, a device for closing communication between the tap and casing, means for conveying said liquid by way of said casing to a dispensing faucet, means for causing said liquid to return to the source of supply, means for subjecting the device to a cleaning fluid to cut off the source of supply and admit the cleaning fluid to said casing and permit said fluid to flow by way of said conveying means to and through the faucet.

11. In apparatus of the character described, the combination of a casing having valve seats containing openings at each end thereof and an intermediately located outlet, together with means for establishing communication with a receptacle containing liquid under pressure, a piston having end valves each adapted to cut off its opening from the outlet before the other valve places its opening in communication with said outlet, the liquid under pressure normally holding the piston to maintain communication between said first named means and the casing outlet, and a valve for actuating said piston by fluid pressure.

12. In an apparatus for dispensing liquids, the combination of a casing having an outlet port between its ends and an inlet port on each side of said outlet port, a pipe leading from said outlet port to a dispensing faucet, a valve normally acting under the pressure of the liquid to be dispensed to afford communication between one inlet port and said outlet port, means for introducing through the other inlet port a cleansing liquid which acts by its superior pressure on said valve to cut off communication between said first inlet and the outlet and to establish communication between the second inlet and the outlet in order to flush out the dispensing pipe.

Signed at New York city in the county of New York and State of New York this 18th day of July A. D. 1906.

GUSTAV A. SETZER.

Witnesses:
FRANK M. ASHLEY,
FRANK L. SEAVER.